United States Patent Office 3,341,490
Patented Sept. 12, 1967

3,341,490
BLENDS OF TWO POLYSILOXANE COPOLYMERS WITH SILICA
Duane F. Burdick, Midland, James L. Mishler, Chesaning, and Keith E. Polmanteer, Midland, Mich., assignors to Dow Corning Corporation, Midland, Mich., a corporation of Michigan
No Drawing. Filed Aug. 13, 1964, Ser. No. 389,472
11 Claims. (Cl. 260—37)

ABSTRACT OF THE DISCLOSURE

Blends of siloxane copolymers are disclosed which are useful for making optically clear articles, especially contact lenses.

This invention relates to blends of copolymers. The copolymer blends of this invention are particularly useful in the manufacture of articles wherein optical clarity is desirable. For example, the blends are useful as interlayers in safety glass, in the preparation of pharmaceutical equipment, in the preparation of volumetric apparatus and in the preparation of lenses, especially contact lenses.

More specifically, this invention relates to a blend of copolymers which consists essentially of 60 to 70 parts of a dimethylvinylsilyl endblocked copolymer consisting essentially of about 6 to 9 mol percent of phenylmethylsiloxane units, about 0.1 to 0.2 mol percent of vinylmethylsiloxane units and the balance essentially dimethylsiloxane units and 30 to 40 parts of a dimethylvinylsilyl endblocked copolymer consisting essentially of about 15 to 25 mol percent of methylvinylsiloxane units, about 4 to 6 mol percent of phenylmethylsiloxane units and the balance essentially dimethylsiloxane units, there being a total of 100 parts of the two polymers in the composition, said parts being on a weight basis.

This invention also relates to a blend of copolymers as defined above which contains a reinforcing silica filler.

The invention further relates to vulcanized elastomeric compositions prepared by vulcanizing the blends of copolymers of this invention.

Another facet of this invention are contact lens prepared from the copolymer blends and in particular those containing a reinforcing silica filler. An especially preferred composition for making contact lenses is one which consists essentially of about 65 parts of a dimethylvinyl endblocked copolymer consisting essentially of about 7.5 mol percent of phenylmethylsiloxane units, about 0.14 mol percent of vinylmethylsiloxane units and about 92.36 mol percent of dimethylsiloxane units, about 35 parts of a dimethylvinylsilyl endblocked copolymer consisting essentially of about 20 mol percent methylvinylsiloxane units, about 5 mol percent phenylmethylsiloxane units and about 75 mol percent dimethylsiloxane units, about 3 to 7 parts of a trimethylsilyl treated silica reinforcing filler and about 0.5 to 2.5 parts of an organic peroxide vulcanizing agent, said parts being on a weight basis.

Other objects, advantages and aspects of this invention will be apparent from the following description, examples and claims.

Copolymers of the general type used in making the blends of this invention as well as means for their preparation, are well known to those skilled in the art. Therefore no need exists in occupying space here with information readily available elsewhere in the art. The copolymers used in preparing the blends can be in the form of gums, fluids or combinations of these.

When a filler is employed in the blend of copolymers it is preferably a reinforcing silica filler. A reinforcing silica filler, as those skilled in the art know, is one having a surface area of at least 50 square meters per gram as measured by nitrogen adsorption employing the method described in ASTM Special Technical Bulletin No. 51, p. 95 et seq. (1941). This filler can be, for example, a fume silica, silica aerogel or a silica xerogel. A particularly preferred type of reinforcing silica is a trimethylsilyl treated material, especially of the type described in U.S. Patent 3,036,985. Generally, the higher the surface area of the silica is, the more desirable the silica is as a reinforcing filler. Therefore, it is preferable that the silica have a surface area of at least 150 square meters per gram and more preferably above 300 square meters per gram. There is no critical maximum for the surface area which can be 900 square meters per gram or more. Of course, extending fillers such as crushed quartz, diatomaceous earth, calcium carbonate, titanium dioxide and alumina can be incorporated into the copolymer blends, however, the use of this type of filler is not preferred when the compositions of this invention are used to make contact lenses.

The copolymer blends of this invention can be vulcanized by conventional techniques well known to those skilled in the art. For example the blends can be vulcanized by irradiation or with peroxides employing the usual organic peroxide vulcanizing agents. Two organic peroxide vulcanizing agents that have been found to be particularly useful are dicumyl peroxide and tertiary butylperbenzoate.

The blending of the two copolymers to produce the composition of this invention can be done by any suitable technique. Obviously, it is desirable that whatever technique be employed that it result in a reasonably uniform or homogeneous blend of copolymers in order that the best possible results are obtained. The particular blending technique used will be determined by such factors as the blending equipment readily available, the nature of the copolymers being blended (for example whether they are gums, fluids or both) and the ultimate use of the blend.

So far as is known, the proportions of the copolymers in the blend as well as the proportions and type of the siloxane units in each copolymer is critical, within the above limits, if one wishes to have products which are useful in the manufacture of articles having optical clarity.

In order that those skilled in the art can better understand how the present invention can be practiced, the following examples are given by way of illustration and not by way of limitation.

All parts and percents referred to herein are on a weight basis and all viscosities measured at 25° C. unless otherwise specified.

*Example 1*

A blend of copolymers consisting essentially of (A) 65 parts of a dimethylvinylsilyl endblocked copolymer gum consisting essentially of about 7.5 mol percent phenylmethylsiloxane units, about 0.14 mol percent methylvinylsiloxane units and 92.36 mol percent dimethylsiloxane units, (B) about 35 parts of a dimethylvinylsilyl endblocked copolymer gum consisting essentially of about 15 mol percent methylvinylsiloxane units, about 5 mol percent phenylmethylsiloxane units and about 80 mol percent dimethylsiloxane units and (C) about 5 parts of 2,5-dimethyl-2,5-di(t-butylperoxy)hexane as a vulcanizing agent was prepared. The two copolymer gums were first blended on a two roll mill and then the vulcanizing agent added and milled in.

A second blend of copolymers was prepared which was identical to the first except that 60 parts of (A) and 40 parts of (B) were used.

Lenses were press molded from these blends in a highly polished steel mold for about 15 minutes at 150 °C. and 500 pounds of pressure. The lenses were hot released from the mold using a fluorocarbon release agent. Lenses made from both formulations were clear.

Example 2

A blend of copolymers was prepared which was identical to the first blend in Example 1 except that a dimethylvinylsilyl endblocked copolymer gum consisting essentially of about 20 mol percent methylvinylsiloxane units, about 5 mol percent phenylmethylvinylsiloxane units and about 75 mol percent of dimethylsiloxane units was employed as copolymer (B).

Lenses were press molded from this composition using the same procedure as in Example 1.

Example 3

A blend of copolymers was prepared which was identical to the first blend in Example 1 except that a dimethylvinylsilyl endblocked copolymer gum consisting essentially of about 25 mol percent methylvinylsiloxane units, about 4 mol percent phenylmethylsiloxane units and about 71 mol percent dimethylsiloxane units was employed as copolymer (B).

Lenses were press molded from this composition using the same procedure as in Example 1.

Example 4

A blend of copolymers was prepared which was identical to the first blend in Example 1 except that a dimethylvinylsilyl endblocked copolymer gum consisting essentially of about 15 mol percent of methylvinylsiloxane units, about 5 mol percent of phenylmethylsiloxane units and about 80 mol percent of dimethylsiloxane units was employed as copolymer (B) and 5 parts of a trimethylsilyl treated silica reinforcing filler was milled in with the polymers before the peroxide was added.

A second blend of copolymers was prepared which was identical to the one above except that it contained 10 parts of the filler.

Lenses were press molded from both of the compositions using the same procedure as in Example 1. The resulting lenses were clear.

Example 5

A blend of copolymers was prepared which was identical to the blend of Example 2 except that 70 parts of copolymer (A) and 30 parts of copolymer (B) were used in the blend and 5 parts of a trimethylsilyl treated silica reinforcing filler was milled in with the copolymers before the peroxide was added.

A second blend of copolymers was prepared which was identical to the first except that it contained 2 parts of the peroxide instead of 5.

Example 6

Three copolymer blends were prepared which were identical to the blend of Example 2 except that 5 parts of a trimethylsilyl treated silica reinforcing filler was milled in with the copolymers before the peroxide was added and the amount of peroxide employed in these formulations was 2, 1 and 0.5 parts, respectively.

Example 7

A blend of copolymers was prepared which was identical to the second blend of Example 5 except that 67.5 parts of copolymer (A) and 32.5 parts of copolymer (B) were employed.

Example 8

A blend of copolymers was prepared which was identical to that of Example 2 except that 30 parts of a trimethylsilyl treated silica reinforcing filler and 1 part of ethylpolysilicate were first milled in with the copolymer and then 1 part of dicumylperoxide vulcanizing agent was milled into the copolymer blend.

Example 9

A blend of copolymers was prepared which was identical to the first blend of Example 5 except that 66 parts of copolymer (A) and 34 parts of copolymer (B) were employed.

Example 10

A blend of copolymers was prepared which was identical to the second blend of Example 5 except that 65 parts of copolymer (A) and 35 parts of copolymer (B) were employed and dicumylperoxide was used as the vulcanizing agent.

Example 11

A blend of copolymers was prepared which was identical to that of Example 10 except that 60 parts of copolymer (A) and 40 parts of copolymer (B) were employed.

Example 12

Four copolymer blends were prepared which were identical to the blend of Example 8 except that all of them contained 5 parts of the ethylpolysilicate and 2 parts of the peroxide, and they contained 40, 25, 20 and 5 parts, respectively, of the reinforcing silica filler.

Lenses were press molded from these compositions using the same procedure as in Example 1.

Example 13

A blend of copolymers was prepared by adding about 5 parts of a trimethylsilyl treated reinforcing silica filler to about 30 parts of (A) a dimethylvinylsilyl endblocked copolymer gum consisting essentially of about 7.5 mol percent phenylmethylsiloxane units, about 0.14 mol percent methylvinylsiloxane units and about 92.36 mol percent dimethylsiloxane units, on a two roll mill. After the filler was milled in, about 40 parts of (B) a dimethylvinylsilyl endblocked copolymer gum consisting essentially of 20 mol percent methylvinylsiloxane units, 5 mol percent phenylmethylsiloxane units and 75 mol percent dimethylsiloxane units, about 0.75 part tertiary butyl perbenzoate and about 30 additional parts of copolymer (A) were added to the mill, with milling being continued about 10 to 15 minutes after the addition was complete.

Example 14

The procedure of Example 13 was repeated except that a total of 65 parts of (A) and 35 parts of (B) were used. Also, both copolymers (A) and (B) used in this example had a degree of polymerization of about 3500. The resulting blend had excellent clarity and therefore was useful as interlayer for safety glass and for making contact lenses.

Example 15

A blend of copolymers identical to that of Example 14 was prepared except that both copolymers (A) and (B) used in this example were fluids and had a degree of polymerization of about 1500. The procedure used in preparing this blend was as follows: First the filler and then the peroxide was spatula mixed into the fluid copolymers. The resulting crude dispersion was then placed into a Semco mixing pot and the dispersion mixed with a Semco mixer. After about 425 mixing strokes, an excellent lens was molded from the resulting copolymer blend.

Example 16

A blend of copolymers was prepared as follows: First three mixtures having compositions as indicated below were prepared. (1) was a mixture consisting of 21.67 parts of a base (composed of 16.67 parts of copolymer gum (A) and 5 parts of the filler of Example 13) and 16.67 parts of fluid copolymer (A) of Example 15. This mixture was prepared by slowly adding the fluid copolymer to the base on a two roll mill. (2) was a mixture consisting of 21.66 parts of fluid copolymer (A) and 35 parts of fluid copolymer (B), both of Example 15. (3) was a mixture consisting of 10 parts of fluid copolymer (A) of Example 15 and 0.75 part of tertiary butyl perbenzoate.

Mixtures (1) and (2) were charged to a Semco pot and de-aired overnight. Mixture (3) was allowed to set overnight after mixing. The next day (3) was added to (1) and (2) in the pot and the charge mixed on a Semco mixer. Lenses prepared from this resulting blend had excellent surfaces, clarity and retractability.

*Example 17*

The procedure of Example 16 was repeated except that mixtures (1), (2) and (3) contained the following amounts of the materials: (1) 86.68 parts of the base (66.68 parts of copolymer gum (A) and 20 parts of the filler of Example 13) and 66.68 parts of fluid copolymer (A) of Example 15. (2) 96.64 parts of fluid copolymer (A) and 140 parts of fluid copolymer (B). (3) 30 parts of fluid copolymer (A) and 3 parts of the peroxide.

Essentially identical results were obtained.

*Example 18*

The procedure of Example 16 was repeated except that the mixtures (1), (2) and (3) contained the following amounts of the materials.

(1) 26 parts of the base (20 parts of copolymer gum (A) and 6 parts of the filler of Example 13) and 20 parts of fluid copolymer (A) of Example 15.

(2) 15 parts of fluid copolymer (A) and 35 parts of fluid copolymer (B).

(3) 10 parts of fluid copolymer (A) and 1 part of the peroxide.

Essentially identical results were obtained.

*Example 19*

When the following copolymer blends are prepared, they can be used to make articles requiring optical clarity.

(1) A composition consisting essentially of 62 parts of a dimethylvinylsilyl endblocked copolymer consisting essentially of about 6 mol percent of phenylmethylsiloxane units, about 0.1 mol percent methylvinylsiloxane units and about 93.9 mol percent dimethylsiloxane units and 38 parts of a dimethylvinylsilyl endblocked copolymer consisting essentially of about 25 mol percent methylvinylsiloxane units, about 6 mol percent phenylmethylsiloxane units and about 69 mol percent dimethylsiloxane units.

(2) A composition consisting essentially of 64 parts of a dimethylvinylsilyl endblocked copolymer consisting essentially of about 9 mol percent phenylmethylsiloxane units, about 0.2 mol percent methylvinylsiloxane units and about 90.8 mol percent dimethylsiloxane, 36 parts of a dimethylvinylsilyl endblocked copolymer consisting essentially of about 22 mol percent methylvinylsiloxane units, about 5.5 mol percent phenylmethylsiloxane units and about 72.5 mol percent dimethylsiloxane units, 3 parts of a reinforcing silica filler and 0.5 part of tertiary butyl perbonzoate.

(3) A composition consisting essentially of 66 parts of a dimethylvinylsilyl endblocked copolymer consisting essentially of about 7 mol percent of phenylmethylsiloxane units, about 0.16 mol percent methylvinylsiloxane units and about 92.84 mol percent dimethylsiloxane units and 34 parts of a dimethylvinylsilyl endblocked copolymer consisting essentially of about 15 mol percent methylvinylsiloxane units, about 4 mol percent phenylmethylsiloxane units and about 81 mol percent dimethylsiloxane units.

(4) A composition consisting essentially of 65 parts of a dimethylvinylsilyl endblocked copolymer consisting essentially of about 8 mol percent phenylmethylsiloxane units, about 0.12 mol percent methylvinyl siloxane units and about 91.88 mol percent dimethylsiloxane units and 35 parts of a dimethylvinylsilyl end blocked copolymer consisting essentially of about 18 mol percent methylvinylsiloxane units, about 4.5 mol percent phenylmethylsiloxane units and about 77.5 mol percent dimethylsiloxane units.

That which is claimed is:

1. A composition consisting essentially of 60 to 70 parts of a dimethylvinylsilyl endblocked copolymer consisting essentially of about 6 to 9 mol percent of phenylmethylsiloxane units, about 0.1 to 0.2 mol percent of vinyl-methylsiloxane units and the balance essentially dimethylsiloxane units and 30 to 40 parts of a dimethylvinylsilyl endblocked copolymer consisting essentially of about 15 to 25 mol percent of methylvinylsiloxane units, about 4 to 6 mol percent of phenylmethylsiloxane units and the balance essentially dimethylsiloxane units, there being a total of 100 parts of the two polymers in the composition, said parts being on a weight basis.

2. The composition of claim 1 which also contains a reinforcing silica filler.

3. The composition of claim 2 which contains 3 to 7 parts of a trimethylsilyl treated silica filler.

4. The composition of claim 1 which also contains an organic peroxide vulcanizing agent.

5. The vulcanized elastomeric composition produced by vulcanizing the composition of claim 1.

6. A contact lens prepared by vulcanizing the composition of claim 2.

7. A composition consisting essentially of about 65 parts of a dimethylvinyl endblocked copolymer consisting essentially of about 7.5 mol percent of phenylmethylsiloxane units, about 0.14 mol percent of vinylmethylsiloxane units and about 92.36 mol percent of dimethylsiloxane units, about 35 parts of a dimethylvinyl-silyl endblocked copolymer consisting essentially of about 20 mol percent methylvinylsiloxane units, about 5 mol percent phenylmehtylsiloxane units and about 75 mol percent dimethylsiloxane units, about 3 to 7 parts of a trimethylsilyl treated silica reinforcing filler and about 0.5 to 2.5 parts of an organic peroxide vulcanizing agent, said parts being on a weight basis.

8. The composition of claim 7 wherein the peroxide is dicumyl peroxide.

9. The composition of claim 7 wherein the peroxide is tertiary butylperbenzoate.

10. The vulcanized elastomeric composition produced by vulcanizing the composition of claim 7.

11. A contact lens prepared by vulcanizing the composition of claim 7.

No references cited.

MORRIS LIEBMAN, *Primary Examiner.*

L. T. JACOBS, *Assistant Examiner.*